US012085243B2

(12) United States Patent
Li

(10) Patent No.: US 12,085,243 B2
(45) Date of Patent: Sep. 10, 2024

(54) ELECTRONIC CANDLE

(71) Applicant: L&L Candle Company, LLC, Brea, CA (US)

(72) Inventor: Xiaofeng Li, Shenzhen (CN)

(73) Assignee: L&L Candle Company, LLC, Brea, CA (US)

( * ) Notice: Subject to any disclaimer, the term of this patent is extended or adjusted under 35 U.S.C. 154(b) by 0 days.

(21) Appl. No.: 18/305,633

(22) Filed: Apr. 24, 2023

(65) Prior Publication Data

US 2023/0383918 A1 Nov. 30, 2023

Related U.S. Application Data

(63) Continuation of application No. 17/714,549, filed on Apr. 6, 2022, now Pat. No. 11,635,183, which is a (Continued)

(30) Foreign Application Priority Data

Jul. 14, 2020 (CN) ......................... 202021394856.9

(51) Int. Cl.
*F21S 10/04* (2006.01)
*F21S 9/02* (2006.01)
(Continued)

(52) U.S. Cl.
CPC ............... *F21S 10/046* (2013.01); *F21S 9/02* (2013.01); *F21V 14/08* (2013.01); *F21V 17/10* (2013.01); *F21V 23/06* (2013.01)

(58) Field of Classification Search
CPC ........ F21S 10/04; F21S 10/043; F21S 10/046; F21S 9/02; F21V 23/06; F21V 17/10; F21V 14/08
See application file for complete search history.

(56) References Cited

U.S. PATENT DOCUMENTS 10,243,299 B1 * 3/2019 Krize .................... F21V 23/002
10,539,301 B2 1/2020 Li
(Continued)

FOREIGN PATENT DOCUMENTS

EP 1887277 A1 * 2/2008 ............. F21S 6/001
KR 20100000574 U * 1/2010

OTHER PUBLICATIONS

Innovation Q+ NPL Search (Year: 2024).*

*Primary Examiner* — Anabel Ton
(74) *Attorney, Agent, or Firm* — Perkins Coie LLP

(57) ABSTRACT

Methods, systems and devices associated with an electronic candle are disclosed. One example includes an electronic candle includes an outer shell including a through-hole, a light-emitting assembly including a flame sheet configured to protrude through the through-hole, an inner shell positioned within the outer shell, and a self-locking device positioned within a cavity of the inner shell. The self-locking device is configured to operate in (1) a locked state when a switch locks a spring in a compressed state and (2) an unlocked state when the switch releases the spring to be in a relaxed state. The electronic candle also includes a bottom case such that the bottom case is enclosed within the outer shell when the self-locking device is in the locked state and the bottom case is exposed to an external environment beneath the outer shell when the self-locking device is in the unlocked state.

15 Claims, 12 Drawing Sheets

Related U.S. Application Data continuation of application No. 17/362,561, filed on Jun. 29, 2021, now Pat. No. 11,300,262.

(51) Int. Cl.

| | |
|---|---|
| ***F21V 14/08*** | (2006.01) |
| ***F21V 17/10*** | (2006.01) |
| ***F21V 23/06*** | (2006.01) |

(56) References Cited

U.S. PATENT DOCUMENTS

| | | | | |
|---|---|---|---|---|
| 11,300,262 | B2 | 4/2022 | Li | |
| 2017/0067608 | A1 | 3/2017 | Patton | |
| 2018/0245752 | A1* | 8/2018 | Hendricks | F21V 23/06 |
| 2022/0018507 | A1 | 1/2022 | Li | |
| 2022/0299179 | A1 | 9/2022 | Li | |

* cited by examiner

ELECTRONIC CANDLE

CROSS-REFERENCE TO RELATED APPLICATION(S)

This patent document is a continuation of U.S. patent application Ser. No. 17/714,549, filed Apr. 6, 2022, which is a continuation of U.S. patent application Ser. No. 17/362,561, filed Jun. 29, 2021, now U.S. Pat. No. 11,300,262, which claims priority to Chinese Patent Application No. 202021394856.9, filed on Jul. 14, 2020. The entire content of the before mentioned patent application is incorporated by reference in this patent document.

TECHNICAL FIELD

The present disclosure relates to electronic lighting technology, and more particularly, to an electronic candle device.

BACKGROUND

In home facilities, public restaurants, churches, temples, large theme parks or urban public infrastructures, candles are used to provide lighting and to create ceremonial or romantic atmospheres. However, a conventional candle has a short lifetime and needs to be replaced frequently. Moreover, a potential risk of fire due to the fire flame prevents candles from being widely used.

SUMMARY

The present disclosure relates to scented electronic candles that, among other features and benefits, provide rich visual experiences to users.

In one example aspect, an electronic candle includes an outer shell including a through-hole positioned on a top surface of the outer shell, a light-emitting assembly including a flame sheet that protrudes through the through-hole, an inner shell positioned below the light-emitting assembly and within the outer shell, and a self-locking device positioned within a cavity of the inner shell. The self-locking device comprises a switch and a spring. The self-locking device is configured to operate in (1) a locked state when the switch locks the spring in a compressed state and (2) an unlocked state when the switch releases the spring to be in a relaxed state. The electronic candle also includes a bottom case connected to the self-locking device such that the bottom case is enclosed within the outer shell when the self-locking device is in the locked state and the bottom case is exposed to an external environment beneath the outer shell when the self-locking device is in the unlocked state. The bottom case comprises an interface assembly that includes a connection port and a power cord. The bottom case further includes a notch that allows a different connection port of another electronic candle to be inserted into the notch to form a connection with the electronic candle.

In another example aspect, a method of operating an electronic candle that includes an outer shell and an inner shell within the outer shell includes unlocking the electronic candle via a self-locking device positioned within a cavity of the inner shell of the electronic candle such that a bottom case of the electronic candle is exposed to an external environment beneath the outer shell of the electronic candle. The bottom case comprises a connection port and a power cord, and the power cord is removably wound on a winding device of the electronic device. The method includes pulling the connection port and the power cord such that the power cord drives the winding device to rotate. The power cord extends outside of the outer shell through a wire hole via the cavity of the inner shell. The method also includes locking the electronic candle such that the bottom case is hidden within the outer shell of the electronic candle while the electronic candle is in operation.

These, and other, aspects are described in the present document.

DETAILED DESCRIPTION

In order to facilitate the understanding of the features and advantages of the disclosed technology, the present disclosure will be explained with reference to the example figures and embodiments. It is to be noted here that the embodiments and features can be combined with each other, provided that they do not conflict. Thus, the scope of the present disclosure is not limited to the embodiments disclosed below.

Figure 1:
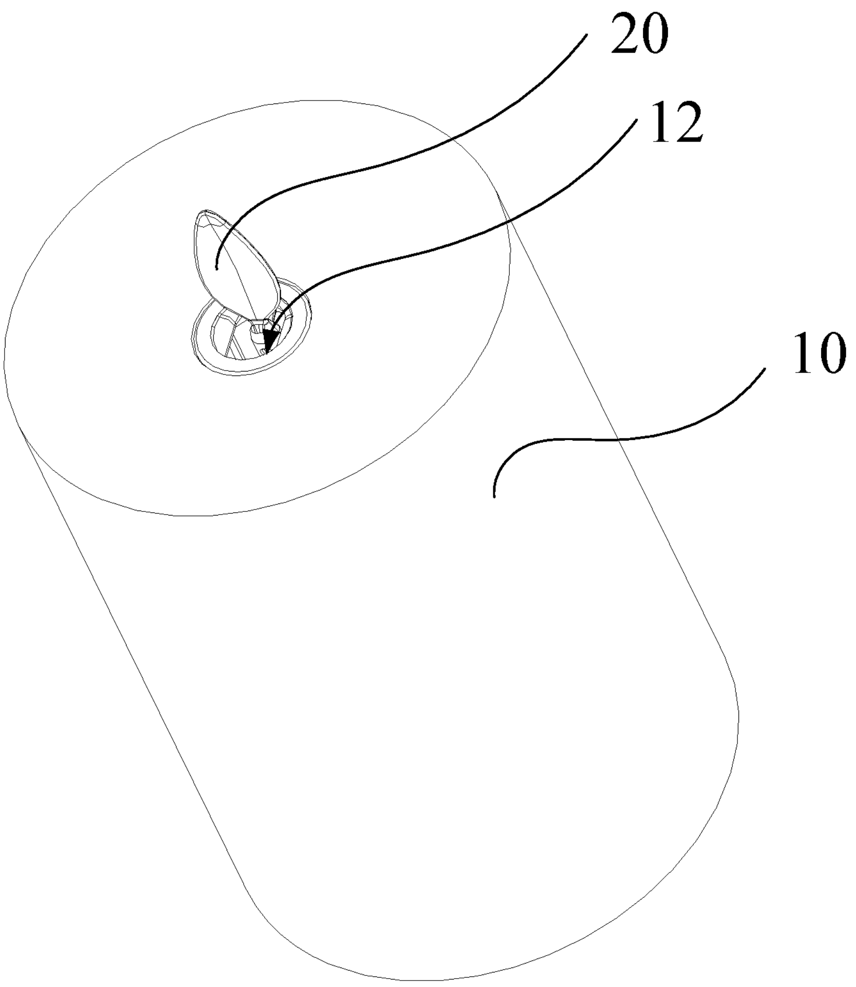
FIG. 1 illustrates an example electronic candle in accordance with one or more embodiments of the present technology.
Figure 2:
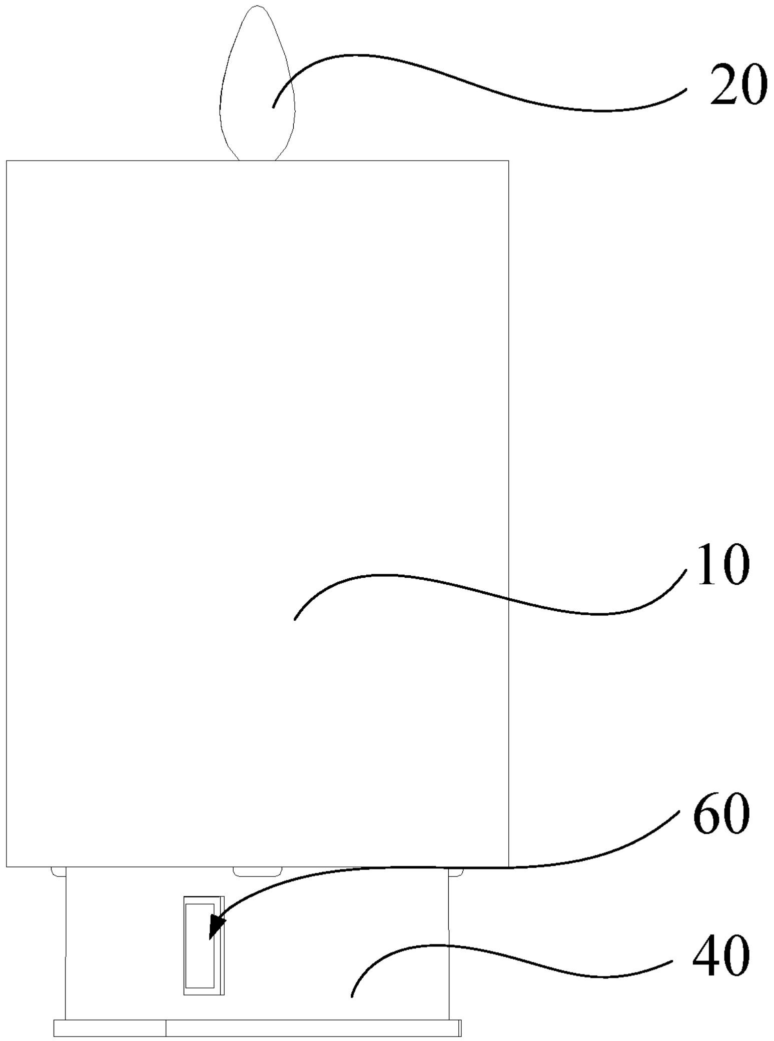
FIG. 2 illustrates an example electronic candle having an exposed interface assembly in accordance with one or more embodiments of the present technology.
Figure 3:
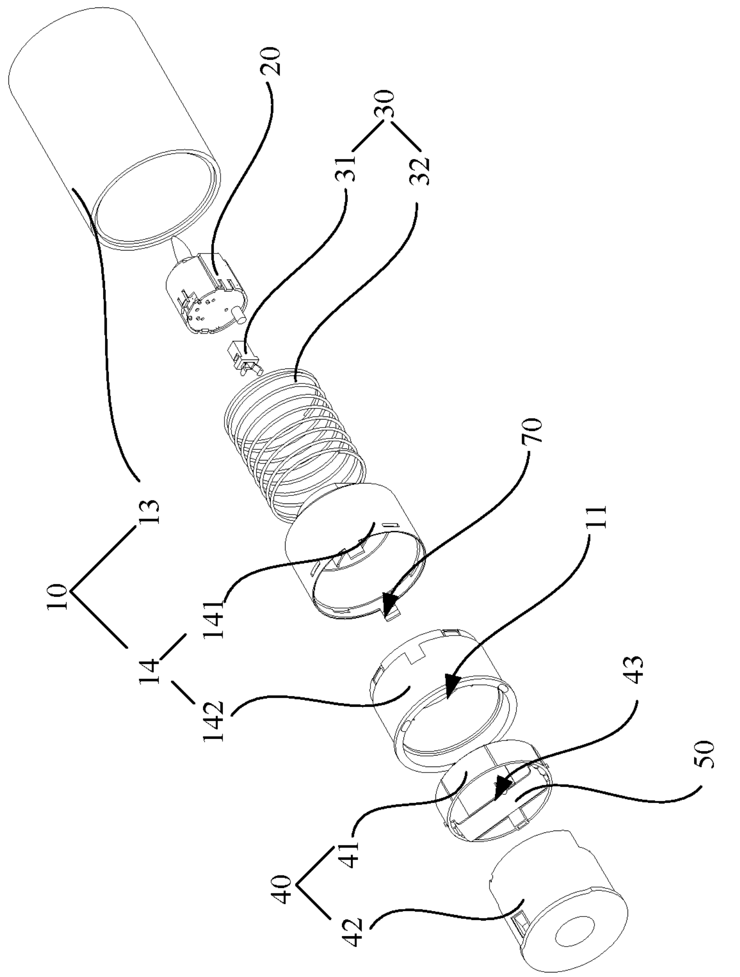
FIG. 3 illustrates a blow-up diagram of components of an example electronic candle in accordance with one or more embodiments of the present technology.
Figure 4:
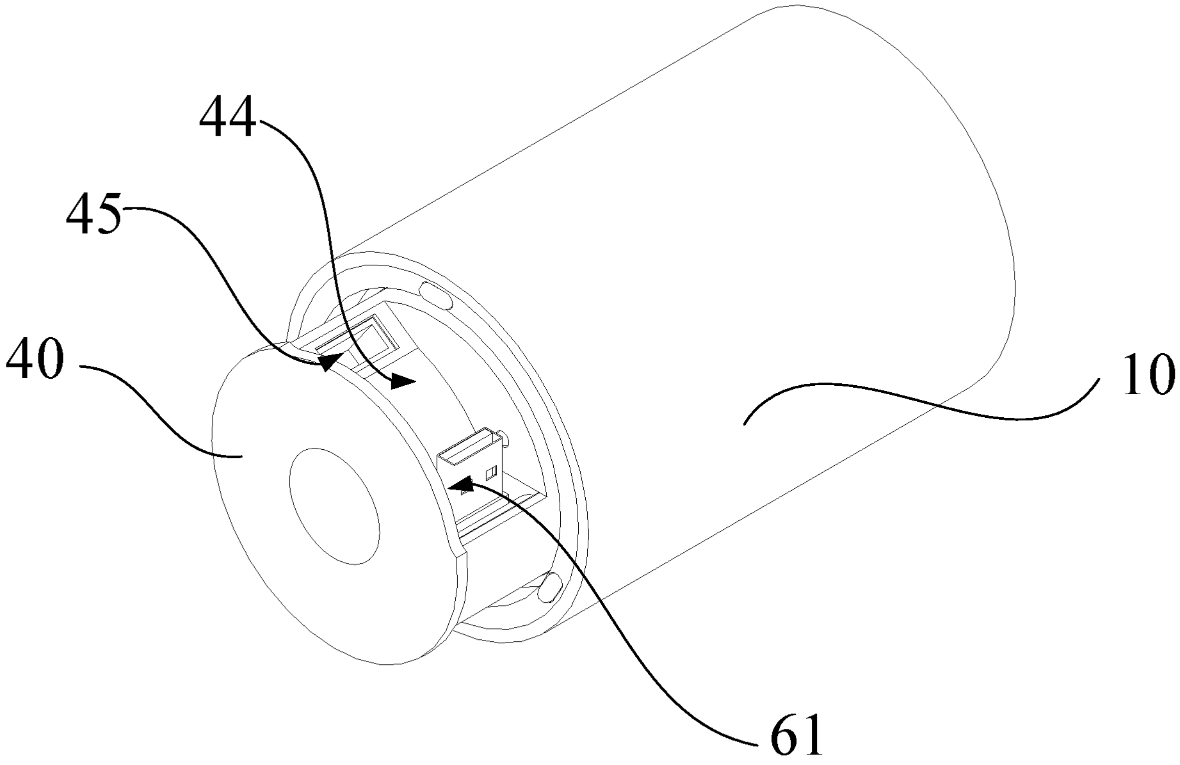
FIG. 4 illustrates an interface assembly of an example electronic candle in accordance with one or more embodiments of the present technology.
Figure 5:
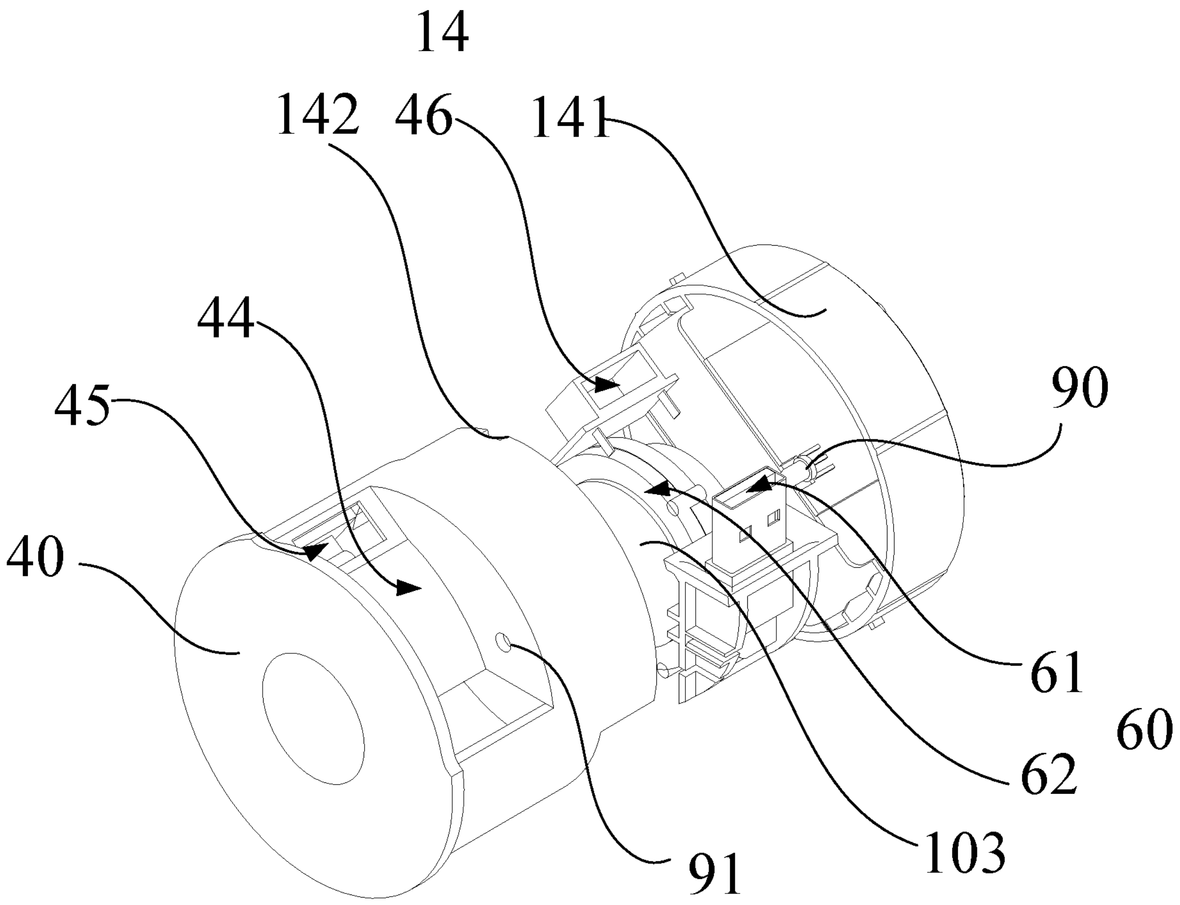
FIG. 5 illustrates an internal structure of an interface assembly of an example electronic candle in accordance with one or more embodiments of the present technology.

FIGS. 1-10 illustrate various examples of an electronic candle in accordance with one or more embodiments of the present technology. In some embodiments, an electronic candle 100 includes: a housing 10 (FIG. 1), a light-emitting assembly 20 (FIG. 1), a self-locking device 30 (FIG. 3), electrical components 50 (FIG. 3), and an interface assembly 60 (FIGS. 3-5).

FIG. 1 illustrates an example configuration of an electronic candle 100 in accordance with one or more embodiments of the present technology. The electronic candle 100 includes a housing 10, a through-hole 12 positioned on a top surface of the housing 10, and a light-emitting assembly 20 having a flame element or a flame sheet protruding from a through hole 12. The flame element or flame sheet has a shape that resembles a real flame.

Conventional electrical candles typically include an interface assembly, such as the Universal Serial Bus (USB) interface, that functions as a communication interface and/or an interface to supply power. The interface assembly is typically arranged on the outer surface of the housing 10. Due to the small size of the interface assembly, it is inconvenient to clean the interface assembly periodically, and dust can accumulate over time and affect the functionality of the interface assembly. In addition, because the interface assembly is exposed on the outer surface of the housing 10, any force or impact on the housing 10 can result in deformation of the interface assembly 60, thereby affecting the connection between the interface assembly 60 and the external communication interface and/or power source.

This patent document discloses techniques that can be implemented in electrical lighting devices to minimize the contamination and impact on the interface assembly. In particular, using the disclosed techniques, the interface assembly can be hidden within the housing 10 (e.g., as shown in FIG. 1). The interface assembly only needs be exposed when it is necessary to form a connection for power or communication (e.g., as shown in FIG. 2).

As shown in FIGS. 2-3, when there is a need to use the interface assembly to provide power or communication connection to the electrical components 50, a self-locking device 30 can eject the bottom case, so that the interface assembly 60 is exposed below the housing 10. After the connection is formed, or when the device is not in use, the interface assembly 60 can be hidden within the cavity 11. The cavity 11 prevents dust from entering the interface assembly 60, thereby ensuring he reliability of the connection between the interface assembly 60 and the external power supply or the external device. The cavity 11 can also protect the interface assembly 60 from collision or other types of impact when the candle device 100 is transported.

FIG. 3 also illustrates some additional components of the electronic candle 100 in accordance with one or more embodiments of the present technology. For example, the electronic candle 100 includes a light-emitting assembly 20 that is positioned within an outer shell 13 of the housing 10. Part of the light-emitting assembly 20 (e.g., a flame element or a flame sheet) passes through the through hole 12 to mimic the appearance of a real candle.

The electronic candle 100 includes a self-locking device 30 arranged in the cavity 11 and connected to the housing 10. The self-locking device 30 can include a self-locking switch 31 and an elastic component 32 (e.g., a spring). The self-locking device 30 can be located on one side of the light-emitting assembly 20 that is away from the through hole 12 (e.g., a bottom side of the light-emitting assembly 20). The self-locking device 30 can be arranged in two states: a locked state to hide the interface assembly 60 and an unlocked state to expose the interface assembly 60 to the external environment. In a locked state, the switch locks the elastic component in a compressed state and in an unlocked state, the switch releases the elastic component to be in a relaxed state.

The electronic candle 100 can also include a bottom case 40 located on the same side as the self-locking device 30. The bottom case 40 is connected to the housing through the self-locking device 30. When the self-locking device 30 is arranged in the locked state, the self-locking device 30 is connected to the bottom case 40 so that both the bottom case 40 and the self-locking device 30 are hidden in the cavity 11. When the self-locking device 30 is arranged in the unlocked case, the self-locking device 30 ejects the bottom case 40 from the cavity 11 so that the bottom case 40 extends outside of the cavity 11 and becomes visible. In some embodiments, part of the self-lock device 30 can also extend outside of the cavity 11.

In some embodiments, the bottom case 40 includes an electrical compartment 43 so that electrical components 50 of the electronic candle 100 can be arranged in the compartment 43. The electrical components 50 can include the necessary power consumption parts for the electronic candle 100 to work, such as a control device, a circuit board, and/or a battery. In some embodiments, the bottom case 40 includes an upper case 41 and a lower case 42 that form the enclosure of the compartment 43. In some embodiments, the upper case 41 and the lower case 42 can facilitate the assembly of the bottom case 40.

In some embodiments, the interface assembly 60 is arranged in the bottom case 40 and is connected to the electrical components 50. In some embodiments, the interface assembly 60 can be used to provide communication connection to an external device to facilitate the configuration of the electronic candle 100. In some embodiments, the interface assembly 60 can also be used to connect to an external power source to supply power to the electrical device 50 for normal operation of the electronic candle 100.

For example, as shown in FIGS. 4-5, the interface assembly 60 can include a connection port 61 (e.g., a USB port) and a power cord 62. In some embodiments, the connection port 61 is provided on the outer surface of the bottom case 40. Both the connection port 61 and the power cord 62 are connected to the electrical components 50. In some embodiments, the electronic candle 100 can include a winding device 103 (as shown in FIG. 5) such that the power cord 62 can be wound on the winding device 103. When power or communication connection is not needed, as shown in FIG. 4, the power cord is stored within the bottom case 40. In some embodiments, a receiving groove 44 is provided on the bottom case 40 to properly position the connection port 61 when it is not in use. The connection port 61 can be hidden inside of the housing 10 so as to minimize damages and prolong the service life of these components.

Figure 6:
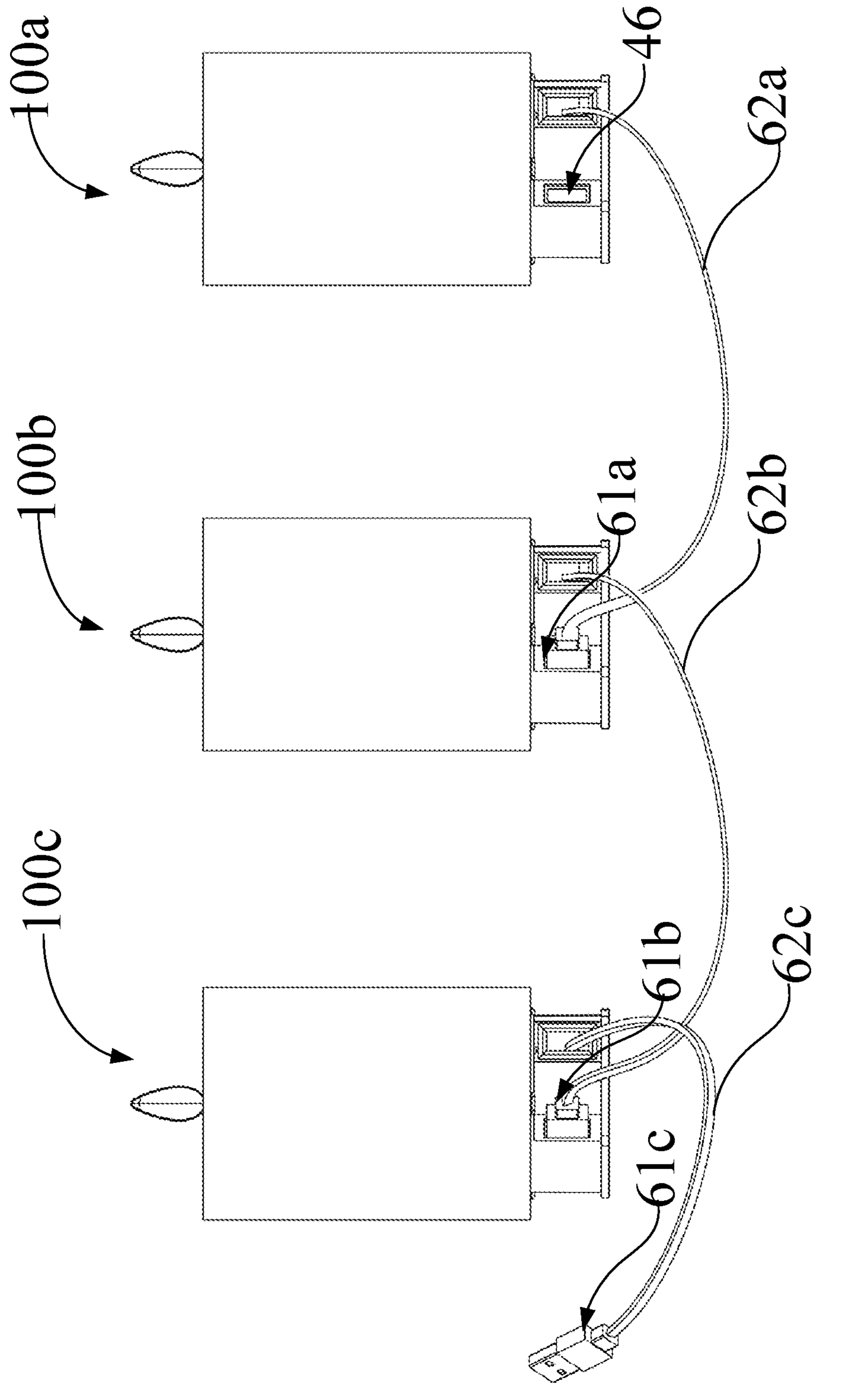
FIG. 6 illustrates an example candle group in accordance with one or more embodiments of the present technology.

In some embodiments, multiple candle devices can be connected in series to form a candle group. As shown in FIGS. 5-6, the connection port 61 can be inserted into an opening 46 of the power cord 62 of another candle device so that a plurality of electronic candles 100 are connected in series to form an electronic candle group. Referring back to FIG. 5, a notch 45 is provided on the bottom case. The notch 45 fits the opening 46 so that another connection port can be inserted into the opening 46 through the notch 45 so as to be connected to the power cord 62 of the candle. This way, one external power source (e.g., connected to connection port 61*c*) can drive the operation of multiple electronic candles 100. Specifically, as shown in FIG. 6, the user can pull the power cord 62 such that the power cord 62 drives the winding device to rotate. After the power cord 62 reaches a proper length, the winding device is automatically locked. The connection port 61 is then inserted into the opening 46 of another power cord 62 of another candle 100 to connect the two devices. When the power cord 62 is not in use, the locking state of the winding device 103 can be released so that the winding device 103 rotates to retract the power cord 62 and position the connection port 61 in the receiving groove 44.

Figure 7A:
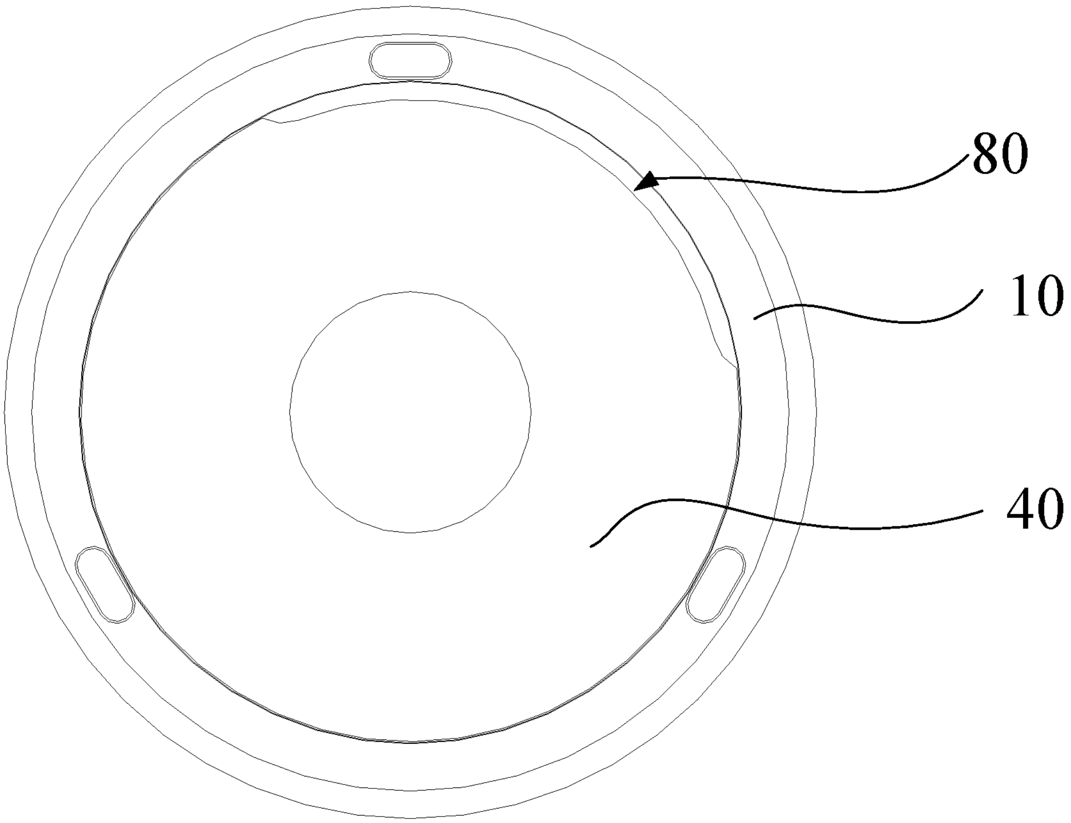
FIG. 7A illustrates a bottom view of an example electronic candle having a wire hole in accordance with one or more embodiments of the present technology.
Figure 7B:
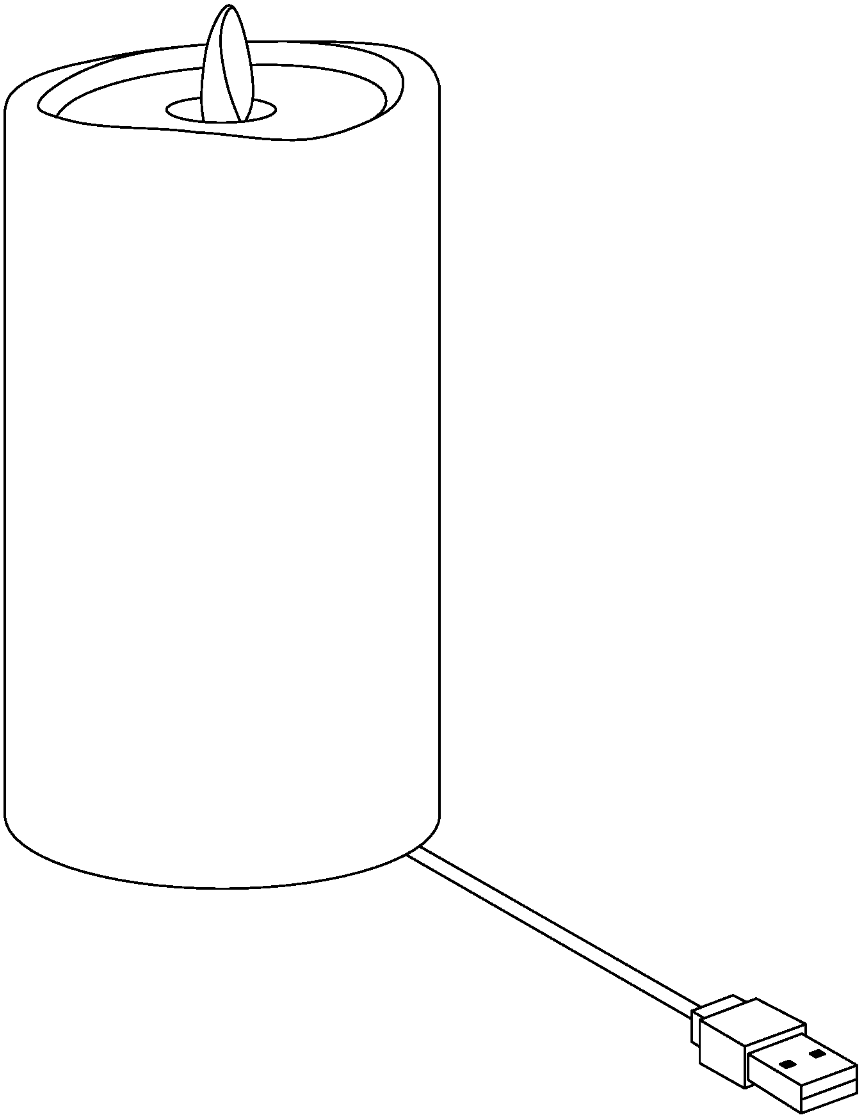
FIG. 7B illustrates an example of a connection port extending outside of the outer shell of an electronic candle in accordance with one or more embodiments of the present technology.

In some embodiments, as shown in FIG. 7A, a wire hole 80 is formed between the notch 45 (e.g., as shown in FIG. 5) and the cavity 11 of the inner shell 14 (e.g., as shown in FIG. 3). The diameter of the wire hole 80 is greater than or equal to the diameter of the power cord 62 so that the power cord 62 can extend outside of the housing through the wire hole 80. In some embodiments, when the power cord is used to power the electronic candle, the bottom case is first ejected from the housing. The power cord can be pulled out of housing via the wire hole to connect to the external power source. This way, as shown in FIG. 7B, the bottom shell can be hidden in the housing even when the power cord is in use, thereby improving the appearance of the electronic candle device during its operation. In some embodiments, the electronic candle further includes a rechargeable battery. The connection port and the power cord can be used to charge the rechargeable battery while supplying power for the operation of the electronic candle.

Referring back to FIG. 5, in some embodiments, the electronic candle 100 further includes an indicator light 90. The indicator light 90 can display the operating status of the electronic candle 100. The indicator light 90 can also display the power status of the rechargeable battery 102. The indicator light 90 can be arranged close to one side of the receiving groove 44. In some embodiments, the receiving groove 44 includes a small hole 91 that allows part of the indicator light 90 to go through, thereby allowing the user to see the indicator light when the bottom case is rejected. In some embodiments, the indicator light 90 can be positioned corresponding to the wire hole 80 so that the user can observe the color of the indicator light 90 through the wire hole 80. Such positioning eliminates the need to provide an additional hole on the housing 10 to show the indicator light, thereby increasing the strength and integrity of the housing.

Figure 8:
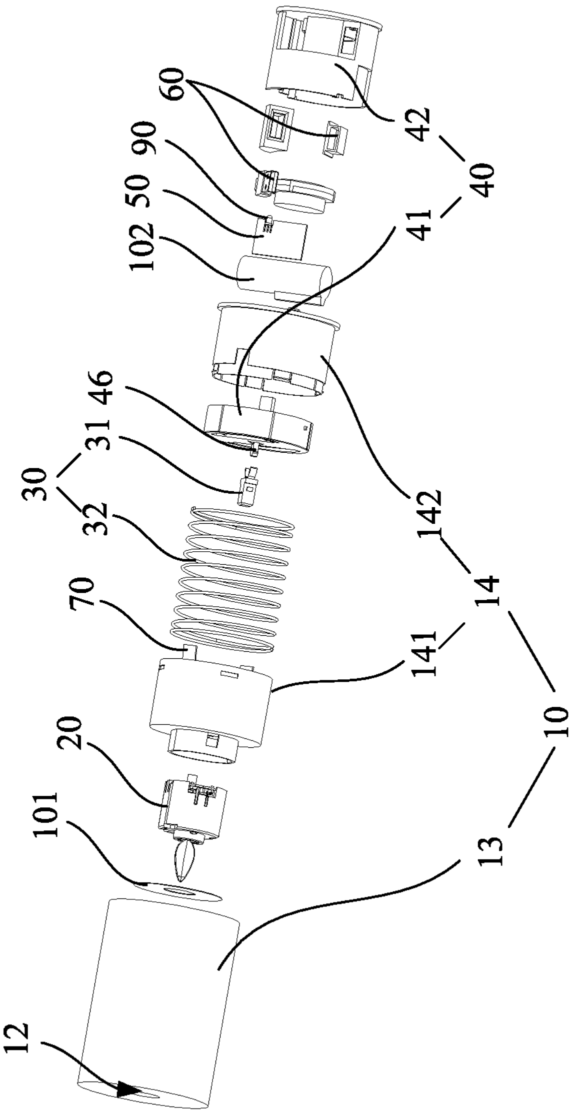
FIG. 8 illustrates another blow-up diagram of components of an example electronic candle in accordance with one or more embodiments of the present technology.

FIG. 8 illustrates another blow-out diagram of an example electronic candle in accordance with one or more embodiments of the present technology. As shown in FIG. 8, in some embodiments, the housing 10 includes an outer shell 13 and an inner shell 14 connected to the outer shell 13. The inner shell 14 can be used as a main load-bearing component with a variety of structures to ensure secure connections of the electrical components 50 and the position of the self-locking device 30. The outer shell 13 can thus be thinner and be made from different materials, thereby reducing the overall weight of the electronic candle 100 and increasing aesthetics of its appearance.

The light-emitting assembly 20 can be positioned on the inner shell 14 and within an installation cavity of the outer shell 13. The outer shell 13 includes a through-hole 12 positioned on its top surface to allow a flame element or a flame sheet of the light-emitting assembly to pass through. In some embodiments, the electronic candle 100 includes a touch element 101 disposed below the top surface of the outer shell 13. The touch element 101 can be shaped as a ring corresponding to the through-hole 12 to allow the user to control the operation of the electronic candle through the touch actions.

The inner shell 14 is positioned within in the installation cavity of the outer shell 13. The inner shell 14 includes a first shell 141 and a second shell 142 that form a cavity 11 (e.g., also shown in FIG. 3). The first shell 141 and the second shell 142 can be removably coupled together using a coupling mechanism. For example, the first shell 141 includes a snap hole on the side wall, and the second shell 142 includes a corresponding snap that can fit into the snap hole to couple the first shell 141 and the second shell 142 together.

In some embodiments, the electronic candle includes a rechargeable battery 102 that is charged through the connection port 61. The rechargeable battery 102 of the electronic candle 100 is charged through the power cord 62.

Figure 9:
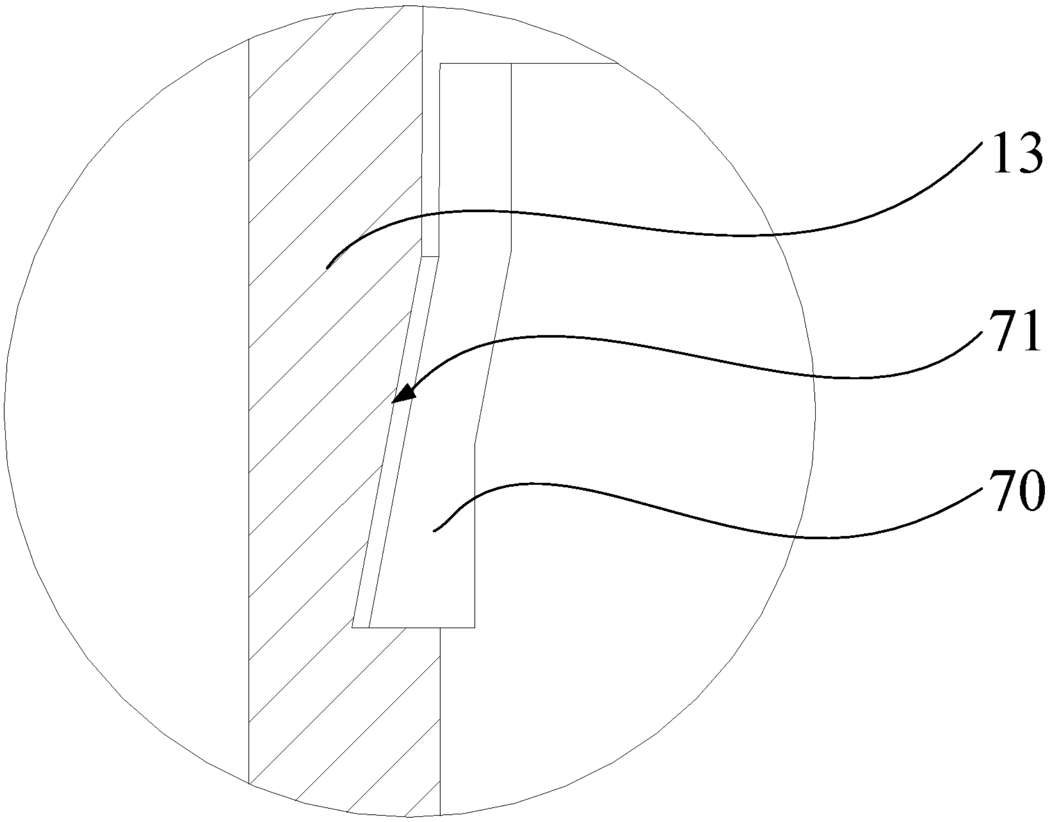
FIG. 9 illustrates an example clamping structure of an example electronic candle in accordance with one or more embodiments of the present technology.

In some embodiments, one or more clamping structures 70 are provided on the outer surface of the inner shell 14 so that the clamping structures 70 can be inserted into the wall of the outer shell 13 so as to be connected to the outer shell 13. FIG. 9 illustrates an example clamping structure 70 of an electronic candle in accordance with one or more embodiments of the present technology. In some embodiments, the clamping structure 70 has a guiding surface 71 that is inclined in the direction from a first end of the inner shell to a second end of the inner shell. For example, the first end of the inner shell is located close to the light-emitting assembly 20, and the second end of the inner shell is located close to the bottom case 40. The outer shell 13 can be sleeved on the inner shell 14 from the first end to the second end via the inclined guiding surface 71. The inclined guiding surface 71 of the clamping structure 70 also makes it difficult for the outer shell 13 to move in the opposite direction (e.g., from the second end to the first end), thereby ensuring the reliability of the connection between the inner shell 14 and the outer shell 13.

In some embodiments, the clamping structure 70 includes a card-shaped protrusion. One end of the card is connected to the first end of the inner shell, and the other end of the card extends toward the second end of the inner shell. In some embodiments, the outer shell 13 includes a waxy material. The card is inserted into the softer wax wall inside of the installation cavity of the outer shell to be connected with the outer shell 13. In some embodiments, the outer shell is a plastic shell. The wall of the outer shell can be provided with a card slot. When the shell is assembled, the card is inserted into the card slot to connect the outer shell with the inner shell. When the outer shell 13 moves in the direction from the second end to the first end, the card abuts against the wall of the outer shell 13 such that the outer shell 13 cannot move, thereby ensuring the reliability of the connection between the outer shell 13 and the inner shell 14. Other shapes of protrusions can also be used to secure the connection between the outer shell 13 and the inner shell 14.

The connection of the clamping structure 70 is simple and the assembly is convenient to improve the production efficiency of the product and reduce the production and manufacturing cost of the product. In addition, the clamping structure 70 does not require additional use of components such as screws, thereby reducing the production cost of the product.

In some embodiments, the protrusion and the inner shell are manufactured as an integral structure to increase the connection strength between the card and the inner shell and improve the mechanical strength of the product. For example, the protrusion can be formed by stamping or pressing the inner shell, thereby improving the production efficiency of the product and reduce the production cost of the product.

Figure 10:
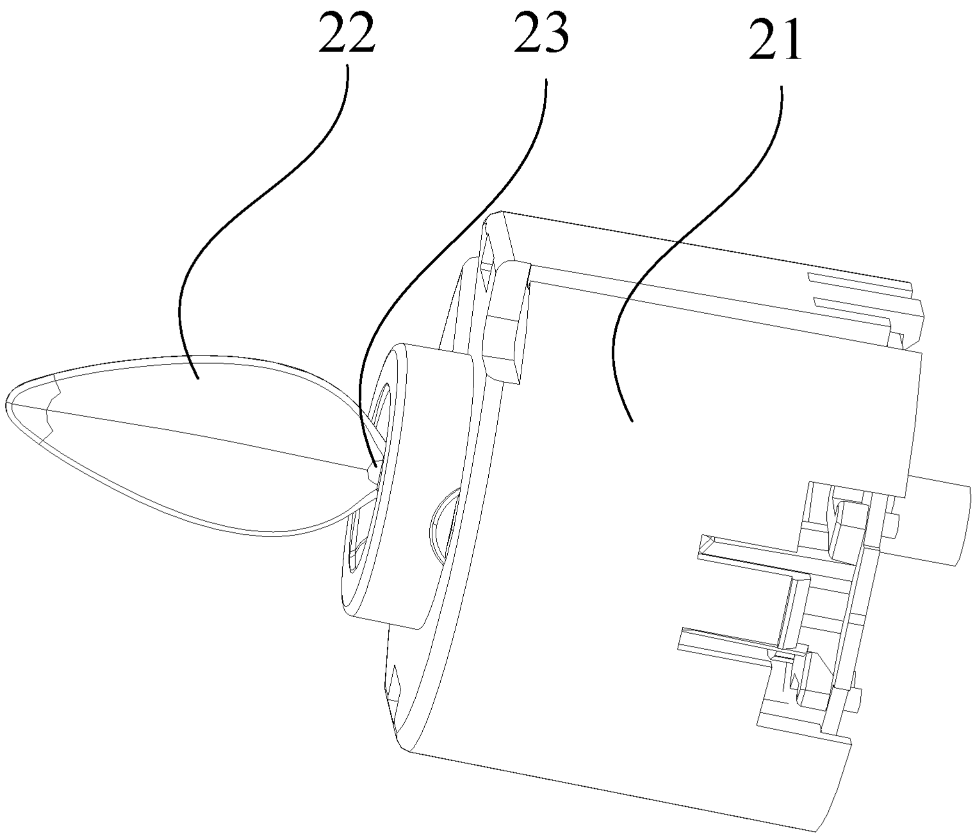
FIG. 10 illustrates an example light assembly in accordance with one or more embodiments of the present technology.

FIG. 10 illustrates another example light-emitting assembly in accordance with one or more embodiments of the present technology. The light-emitting assembly 20 includes a base 21, a flame sheet 22, and a light source 23. The flame piece 22 is arranged on the base 21 and is flexibly movable relative to the base 21. The light source 23 is arranged on the base 21, and the light emitted by the light source 23 can be cast on the flame sheet 22 to create an appearance of a real flame. In some embodiments, the light-emitting assembly includes a fan. The airflow generated by the fan or the airflow from the external environment causes the flame sheet 22 to swing, simulating the appearance of a real flame. In some embodiments, the light-emitting assembly includes a magnet. The magnet can be positioned at the bottom of the flame piece 22, and an electromagnet is provided on the base 21. When the electronic candle 100 is in turned on, the electromagnet generates a magnetic force to drive the magnet, causing the flame sheet 22 to swing irregularly. This irregular swing of the flame piece 22 can mimic the appearance of a real flame.

Figure 11:
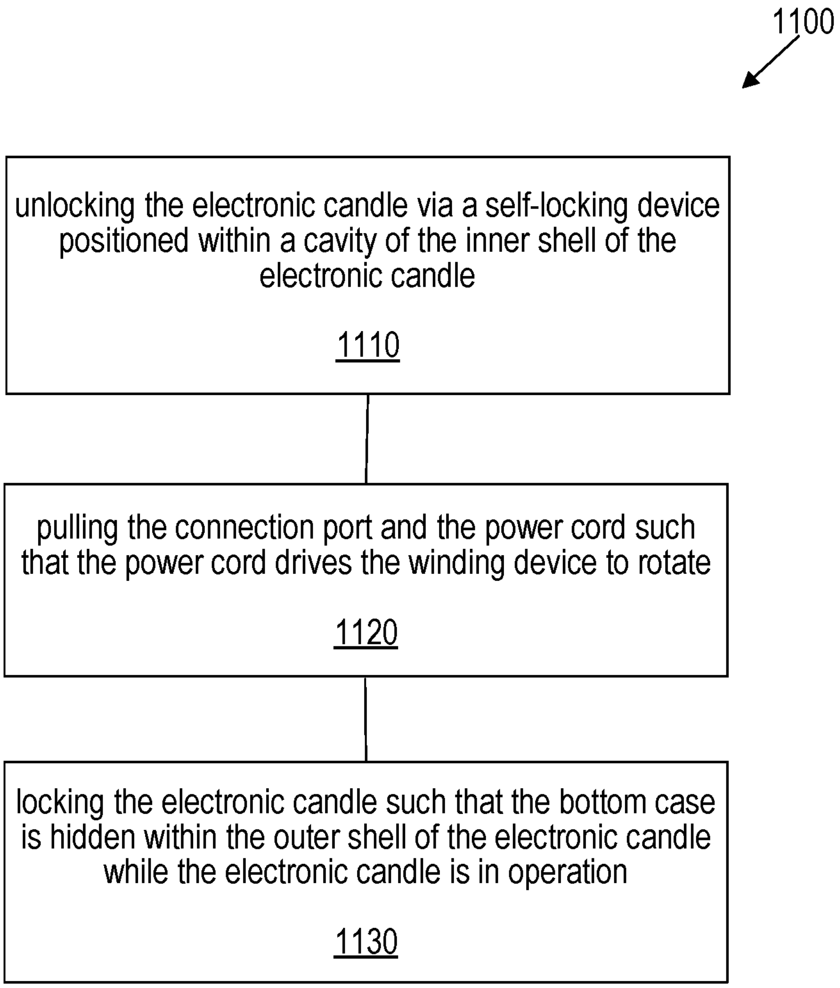
FIG. 11 is a flowchart representation of a method of operating an electronic candle that includes an outer shell and an inner shell within the outer shell in accordance with one or more embodiments of the present technology.

FIG. 11 is a flowchart representation of a method 1100 of operating an electronic candle that includes an outer shell and an inner shell within the outer shell in accordance with one or more embodiments of the present technology. The method 1100 includes, at operation 1110, unlocking the electronic candle via a self-locking device positioned within a cavity of the inner shell of the electronic candle such that a bottom case of the electronic candle is exposed to an external environment beneath the outer shell of the electronic candle. The bottom case comprises a connection port and a power cord, and the power cord is removably wound on a winding device of the electronic device. The method 1100 includes, at operation 1120, pulling the connection port and the power cord such that the power cord drives the winding device to rotate. The power cord extends outside of the outer shell through a wire hole via the cavity of the inner shell. The method 1100 includes, at operation 1130, locking the electronic candle such that the bottom case is hidden within the outer shell of the electronic candle while the electronic candle is in operation.

In some embodiments, the method includes inserting the connection port into an external power source or an external communication interface. In some embodiments, the method includes inserting the connection port into a notch on a second bottom case of a second electronic candle to form a candle group, and inserting a second connection port of the second electronic candle into an external power source to provide power for the candle group. In some embodiments, the method includes unlocking the electronic candle via the self-locking device again to retract the connection port and the power cord back into the electronic candle.

In another example aspect, an electronic candle includes an outer shell including a through-hole positioned on a top surface of the outer shell, a light-emitting assembly including a flame sheet configured to protrude through the through-hole, an inner shell positioned below the light-emitting assembly and within the outer shell, and a self-locking device positioned within a cavity of the inner shell. The self-locking device includes a switch and a spring. The self-locking device is configured to operate in (1) a locked state when the switch locks the spring in a compressed state and (2) an unlocked state when the switch releases the spring to be in a relaxed state. The candle also includes a bottom case connected to the self-locking device such that the bottom case is enclosed within the outer shell when the self-locking device is in the locked state and the bottom case is exposed beneath the outer shell when the self-locking device is in the unlocked state. The bottom case comprises an interface assembly that includes a connection port and a power cord configured to be hidden within the outer shell when the self-locking device is in the locked state. The bottom case further includes a notch that allows a connector from another electronic candle to be inserted into the notch to form a series connection with the electronic candle.

In some embodiments, the bottom case further includes an electrical component configured to hold a control circuit and a battery. In some embodiments, the battery comprises a rechargeable battery.

In some embodiments, wherein the connection port is configured to receive a supply power for the electronic candle or to provide a communication connection to the electronic candle. In some embodiments, the connection port comprises a Universal Serial Bus (USB) port. In some embodiments, the connection port is removably positioned in a groove of the bottom case. In some embodiments, the candle also includes an indicator light configured to display an operating status of the electronic candle. Part of the indicator light extends through a hole on one side of the groove to be visible to a user.

In some embodiments, the power cord is configured to be fully or partially wound on a winding device of the electronic candle. In some embodiments, the device also includes a wire hole having a diameter that is equal to or greater than a diameter of the power cord to enable the power cord to extend outside of the outer shell through the wire hole when the bottom case is enclosed within the outer shell. In some embodiments, the device further includes an indicator light configured to display an operating status of the electronic candle. The indicator light is visible to a user through the wire hole.

In some embodiments, the inner shell includes one or more clamping structures configured to secure the inner shell to the outer shell. In some embodiments, an individual clamping structure includes a card-shaped protrusion. In some embodiments, the individual clamping structure further includes a guiding surface that is inclined with respect to a first end of the inner shell and a second end of the inner shell.

In some embodiments, the light-emitting assembly includes a light source. The light source is positioned to emit light onto the flame sheet to mimic an appearance of a real flame. In some embodiments, the flame sheet of the light-emitting assembly includes a magnet. The light-emitting assembly includes a base that comprises an electromagnet. The electromagnet is configured to a magnetic force to drive a movement of the magnet of the flame sheet to swing irregularly.

In some embodiments, the light-emitting assembly includes a fan configured to generate airflow that causes the flame sheet to swing.

Some of the components or modules that are described in connection with the disclosed embodiments can be implemented as hardware, software, or combinations thereof. For example, a hardware implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application.

Some of the embodiments related to operations such as processing of signals or performing certain tasks and processes, described herein are described in the general context of methods or processes, which may be implemented at least in-part by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), Blu-ray Discs, etc. Therefore, the computer-readable media described in the present application include non-transitory storage media. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

The foregoing is merely illustrative of the preferred embodiments of the present disclosure and is not intended to limit the present disclosure. Various changes and modifications may be made by those skilled in the art. Any modifications, equivalent alternatives are improvements that are made without departing from the spirit and principles of the present disclosure are to be encompassed by the scope of the present disclosure.

What is claimed is:

1. An electronic candle system, comprising:

multiple electronic candles in a series connection with each other, wherein each of the multiple electronic candles comprises:

an outer shell including a through-hole positioned on a top surface of the outer shell;

a light-emitting assembly configured to protrude through the through-hole; and a bottom case enclosed within the outer shell, wherein the bottom case comprises a connection port and a notch, wherein the connection port is configured to receive a power for the electronic candle or to provide a communication connection to the electronic candle, and wherein the notch allows a connector from another electronic candle of the multiple electronic candles to be coupled to the connection port via the notch to form the series connection.

2. The electronic candle system of claim 1, wherein the connector of each of the multiple electronic candles is associated with a Universal Serial Bus (USB) connection.

3. The electronic candle system of claim 1, wherein the connector of each of the multiple electronic candles comprises a power cord.

4. The electronic candle system of claim 3, wherein the power cord is configured to be fully or partially wound on a corresponding electronic candle.

5. The electronic candle system of claim 1, wherein each of the multiple electronic candles comprises a wire hole having a diameter that is equal to or greater than a diameter of a power cord to enable the power cord to extend outside of the outer shell through the wire hole when the bottom case is enclosed within the outer shell.

6. The electronic candle system of claim 1, wherein the light-emitting assembly of each of the multiple electronic candles includes a light source, wherein the light source is positioned to emit light to mimic an appearance of a real flame.

7. The electronic candle system of claim 1, wherein the connection port of each of the multiple electronic candles is removably positioned in a groove of the bottom case.

8. The electronic candle system of claim 1, wherein the bottom case of each of the multiple electronic candles includes an electrical component configured to hold a control circuit and a rechargeable battery.

9. The electronic candle system of claim 1, wherein each of the multiple electronic candles comprises an indicator light configured to display an operating status of the electronic candle.

10. The electronic candle system of claim 1, wherein each of the multiple electronic candles comprises an inner shell positioned below the light-emitting assembly and within the outer shell.

11. The electronic candle system of claim 9, wherein the inner shell includes one or more clamping structures configured to secure the inner shell to the outer shell.

12. A method of operating an electronic candle system, comprising:

connecting a connector of the electronic candle system to an external power source, wherein the electronic candle system comprises multiple electronic candles in a series connection with each other, wherein each of the multiple electronic candles comprises:

an outer shell including a through-hole positioned on a top surface of the outer shell;

a light-emitting assembly configured to protrude through the through-hole; and a bottom case enclosed within the outer shell, wherein the bottom case comprises a connection port and a notch, wherein the connection port is configured to receive a power for the electronic candle, and wherein the notch allows the connector to be coupled to the connection port via the notch to form the series connection; and operating the electronic candle system such that the light-emitting assembly of each of the multiple electronic candles is positioned to emit light to mimic an appearance of a real flame.

13. The method of claim 12, wherein the connector comprises a Universal Serial Bus (USB) connector.

14. The method of claim 12, comprising:

coupling the connection port of a first electronic candle into a notch of a second electronic candle to form the electronic candle system.

15. The method of claim 11, comprising:

pulling the connector to extend outside of the outer shell through a wire hole.

* * * * *